Sept. 8, 1964

A. M. COHEN 3,147,931

SENSING OR CONTROL SYSTEM

Filed Nov. 6, 1961

INVENTOR.
ARTHUR M. COHEN

BY
*James and Franklin*
ATTORNEYS

Sept. 8, 1964 A. M. COHEN 3,147,931
SENSING OR CONTROL SYSTEM
Filed Nov. 6, 1961 2 Sheets-Sheet 2
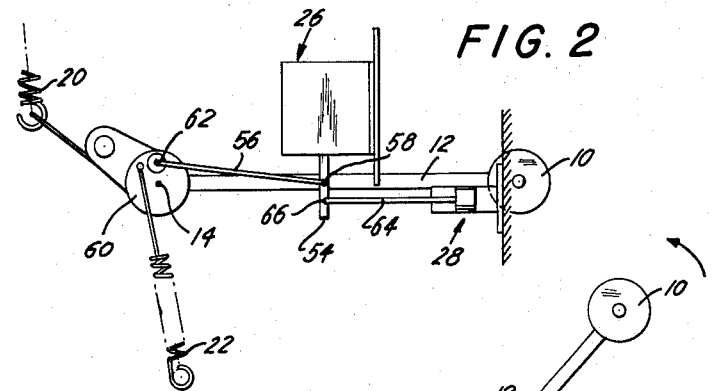
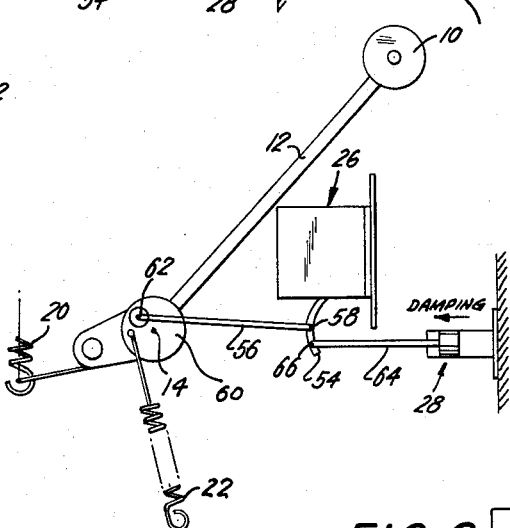
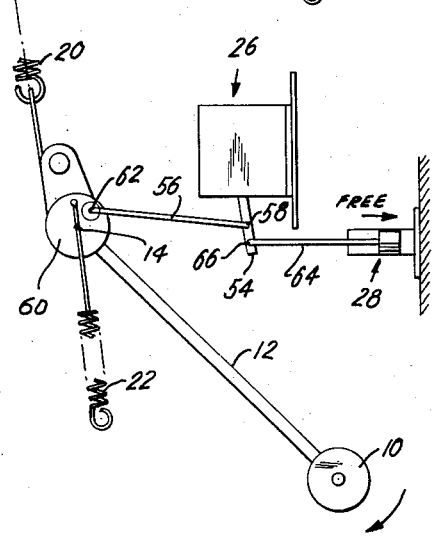
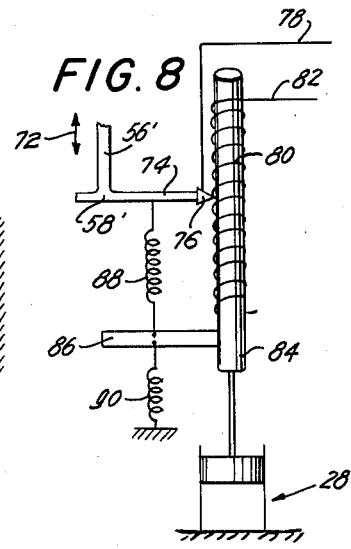
INVENTOR.
ARTHUR M. COHEN
BY
James and Franklin
ATTORNEYS

United States Patent Office 3,147,931
Patented Sept. 8, 1964

3,147,931
SENSING OR CONTROL SYSTEM
Arthur M. Cohen, Sturgis Highway, Westport, Conn.
Filed Nov. 6, 1961, Ser. No. 150,378
19 Claims. (Cl. 242—45)

The present invention relates to a sensing or control system which, by reason of a simple mechanical arrangement, produces an output or control signal which varies not only as the input thereto varies, but also in accordance with the rate of change of that input, thereby producing an anticipation or lead in the output signal.

Control systems generally involve the sensing of some external condition and the production of a signal, be it mechanical or electrical, which bears some known relation to the magnitude of the sensed condition. This signal may be used as such, as in measurement or telemetering purposes, or it may be applied to a control instrumentality in order to produce a desired result. There are many instances where it is desired that the signal thus produced reflect not only the magnitude of the sensed external condition, but also its rate of change. For example, in many closed loop control systems, stability under certain conditions can be obtained only if a greater control action is exerted when the sensed condition is changing rapidly than when it is changing more slowly. In other words, the control action should not only be responsive to the magnitude of the sensed condition, but should also anticipate or lead that sensed condition by an amount depending upon, and bearing a desired relation to, the rate at which the sensed condition is changing. Each control system may require a different degree of lead for optimum results. To artificially produce such a lead in a control system requires either a complex mechanical linkage which, even if precision-made is subject to lost motion and friction, and hence is incompatible with high accuracy requirements, or else complex electrical circuitry which is expensive, space-consuming and trouble-prone.

In accordance with the present invention a simple mechanical arrangement, formed of standard parts which need not be made to any high degree of precision, permits the attainment of the desired lead, that arrangement being readily adjustable to vary the amount of lead produced, thereby to render it adaptable for use in a wide variety of installations with a wide variety of dynamic control characteristics. The mechanical nature of the arrangement of the present invention makes for a very high degree of reliability, and its simplicity makes for ease of manufacture and assembly, which reflects itself in low cost.

The sensing system of the present invention, which may be used as such or as part of an overall control system, includes a movable operative part the position of which determines the output of the sensing device, whether that output be mechanical or electrical. A resiliently yieldable motion-transmitting member is operatively connected to said operative part, the operative connection being such that movement of the motion-transmitting member reflects itself in a change in output. A movable mechanical input member is operatively connected to the yieldable member at a point spaced from the operative part, and motion-retarding means, such as an adjustable dashpot, is operatively connected to said operative part in a sense such as to cause increased operative movement of said part when said input member is moving rapidly than when it is moving more slowly.

If the motion-retarding means is rendered ineffective, movement of the input member will be transmitted by the motion-transmitting member to the operative part in strictly position-proportional fashion, the position of the operative part then being related solely to the position of the input member. However, when the motion-retarding means is effective the exertion of force by the input member on the yieldable motion-transmitting member will be resisted by the motion-retarding means, the motion-transmitting member will resiliently yield, and hence the position of the operative part moved thereby will be dependent not only on the position of the input member but also on the rate at which that input member is moving—the faster the input member moves, the more the motion-retarding means will restrain movement of that part of the yieldable motion-transmitting member to which it is connected, and hence the more will the motion-transmitting member resiliently yield. The degree of yielding of the motion-transmitting member will be dependent not only on the speed of movement of the input member, but also on the actual resistance which the motion-retarding means exerts. Hence, the amount of lead produced can be varied merely by adjusting the effect of the motion-retarding means.

The invention has found widespread use in the control of thread tension in thread winding systems. In such systems, where long lengths of thread are wound on relatively massive bobbins at high speeds, the inertia of the rotating mass is often so great that accurate control of thread tension is impossible without utilizing a control system operating on a lead or anticipation principle. In the past this has been done by means of complicated and expensive equipment. Through the use of the present invention more accurate and more stable control has been achieved, and in a much more reliable manner, with the use of mass-produced, small, and much less expensive apparatus.

To the accomplishment of the above, and to such other objects as may hereinafter appear, the present invention relates to sensing and control systems as defined in the appended claims and as described in this application, taken, together with the accompanying drawings, in which:

FIG. 2 is a schematic view, on an enlarged scale, showing the parts of the system of FIG. 1 stationary and in their normal intermediate position, when the slack loop of the thread had its normal desired length;

FIG. 3 is a view similar to FIG. 2, but showing the positions which the parts assume as the slack loop is in the process of shortening its length, thus indicating an increasing tension on the thread;

FIG. 4 is a view similar to FIG. 2, but showing the portions which the parts assume as the slack loop is in the process of increasing its length, thus indicating a progressive reduction in thread tension;

FIG. 8 is a schematic representation of an alternative mechanical arrangement.

Figure 1:
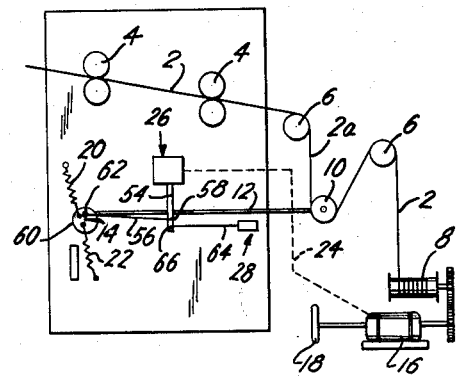
FIG. 1 is a schemaitc view of the invention as applied to the control of thread tension in an electric-motor-driven thread winding system.

The invention is here specifically disclosed in conjunction with the control of thread tension in an electric-motor-driven thread winding system. As shown in FIG. 1, and as is conventional, the thread, generally designated 2, is fed from any suitable supply or production source through guiding rollers 4 and over spaced support rollers 6 to a bobbin 8 on which it is to be wound. The bobbin 8 is adapted to be driven by an electric motor 16 provided with any appropriate type of manual type of speed control, generally designated 18. A slack loop 2a is formed between the support rollers 6, and a roller 10 rests on and is supported by the slack loop 2a. The roller 10 is carried by a dancer arm 12 pivotally mounted at 14. A spring 20 is operatively connected to the dancer arm 12 so as to urge it downwardly, the tension of the spring 20 being selected or adjusted to correspond to the tension desired in the thread 2 as it is being wound. If desired, a spring 22 may be operatively connected to the dancer arm 12 so as to urge it upwardly with a force sufficient to balance the rotative movement of the arm 12 and its roller 10 when they are in their normal or nominal position (here shown as horizontal), thereby permitting more accurate pre-adjustment or pre-selection of the spring 20.

It will be obvious that with this arrangement, if the thread 2 should be wound upon the bobbin 8 more rapidly than the thread is being supplied thereto, the length of the slack loop 2a will be reduced, the dancer arm 12 will rise, and the tension on the thread 2 will increase. Conversely, if the thread 2 is being wound on the bobbin 8 less rapidly than the thread is being supplied thereto, the length of the slack loop 2a will increase, the dancer arm 12 will drop, and the tension on the thread 2 will decrease. Accordingly, and as has been known, the position of the dancer arm 12 can be utilized to control the motor 16, as indicated schematically by broken line 24, causing the speed of the motor 16 to increase when the dancer arm 12 drops and to cause the speed of the motor 16 to decrease when the dancer arm 12 rises, the objective being to keep the length of the slack loop 2a constant and thereby rendering the tension on the thread constant as it is wound.

The winding operation occurs at a high rate of speed, and because of unavoidable mechanical problems the tension on the thread, and hence the length of the slack loop 2a, may tend to vary widely and rapidly. Control systems previously used in this environment have, however, provided for a relatively slow response to variations in thread tension. Moreover, various complicating factors, such as the high moment of inertia of the bobbin after considerable thread has been wound thereon and the fact that the effective diameter of the bobbin changes as thread is wound theron, make the attainment of accurate and stable control very difficult.

In accordance with the present invention the signal 24 which controls changes in the speed of the motor is derived from a system which senses the position of the dancer arm 12 and produces a control signal which not only reflects any deviation in the position of the dancer arm 12 from its norm, but which also may, if desired, reflect the rate of movement of the dancer arm 12, thus inherently producing a greater correcting signal when the dancer arm is moving rapidly than when it is moving less rapidly or is stationary, all for a given instantaneous position of the dancer arm 12. This lead, anticipation or increased signal is brought about by the use of a motion-retarding means generally designated 28 connected to the mechanical system in an appropriate manner.

Figure 7:
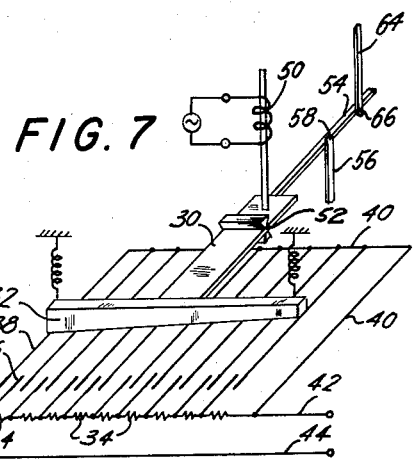
FIG. 7 is a schematic view showing the manner in which the device of FIG. 6 functions to produce an electrical output signal.
Figure 6:
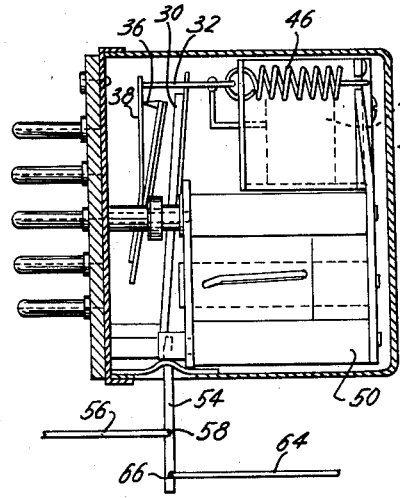
FIG. 6 is a side cross sectional view of one embodiment of a sensing device which may be used in conjuiction with the present invention.

The sensing system includes a transducing device 26 which has an operative part 30 the position of which determines the output or control signal 24. In the embodiment here disclosed the operative part 30 comprises the pivotally mounted actuator arm of a transducer of the type shown in my patent application, Serial No. 34,548, filed June 19, 1960, and entitled "Brushless Mechanico-Electric Transducer," now Patent No. 3,057,979 of October 9, 1962. To that arm 30 is connected a contact-controlling member 32 the position of which controls the effective resistance of a resistor network 34, the ends of the individual resistors of the network 34 being connected to a series of aligned stationary contacts 36. Cooperating and normally engaged with the stationary contacts 36 are a series of movable contact leaves 38 adapted to be sequentially lifted from their respective fixed contacts 36 by movement of the contact-controlling member 32. The movable contacts 38 are connected to one another by lead 40, that lead also being connected to line 42, the resistor network 34 being connected between line 42 and line 44, as shown in FIG. 7. When all of the movable contacts 38 engage their respective fixed contacts 36 the network of resistors 34 is completely shorted out (has a minimal effective resistance). As the movable contacts 38 are sequentially separated from their corresponding fixed contacts 36 one and then another of the individual resistors of the network 34 are inserted into the circuit between the lines 42 and 44, in this way sequentially increasing the effective resistance of the network 34 and producing an electrical signal related to the number of movable contacts 38 which are separated from the fixed contacts 36. The sequential separation of the contact pairs is in turn determined by the position of the contact-controlling member 32, and hence by the position of the actuator arm 30. As is explained in my said prior application, Serial No. 34,548, a biasing spring 46 and a dashpot 48 may be operatively connected to the actuator arm 30 and, in order to produce a substantially stepless output, the actuator arm 30 may be formed at least in part of magnetic material and an alternating magnetic field, as produced by an A.C. energized electromagnet 50, may be made active on the magnetic part of the arm 30 to produce a "dither" effect.

The actuator arm 30 may be rigid, and is mounted to pivot about a fulcrum 52. That portion of the actuator arm 30 extending out beyond the fulcrum 52 has a motion-transmitting member 54 secured thereto and extending out therefrom. This motion-transmitting member 54 is normally self-sustaining but is nevertheless resiliently yieldable. The degree of its resiliency may depend upon the particular control system involved, as will become apparent hereinafter.

The movable mechanical input member 56 is connected to the motion-transmitting member 54 at 58, the point 58 being spaced from the rigid portion (if any) of the operative part 30 and from the fulcrum 52 about which the operative part 30 pivots. The input member 56 is connected to the hub 60 of the dancer arm 12 at a point 62 radially spaced from the center of rotation thereof, so that the input member 56 moves laterally as viewed in FIG. 1 as the dancer arm 12 moves up and down from its nominal horizontal position shown in FIG. 1. When the dancer arm 12 is horizontal the part 30 of the sensing device 26 may be in an intermediate position, with the resistor network 34 having an intermediate effective value of resistance.

Movement of the dancer arm 12 downwardly causes the input member 56 to move to the right, thus moving the motion-transmitting member 54 so as to pivot the operative part 30 in a counter-clockwise direction as viewed in the drawings. This direction of movement of the operative part 30 causes the effective resistance of the resistor network 34 to decrease, producing a signal 24 which will cause the motor 16 to rotate more rapidly, thus tending to shorten the slack loop 2a and causing the dancer arm 12 to return to its nominal horizontal position. Conversely, as the dancer arm 12 rises the input member 56 will be moved to the left, the motion-transmitting member 54 will be moved so as to cause the operative part 30 to pivot in a clockwise direction, the effective resistance of the resistor network 34 will increase, and the signal 24 will be such as to cause the motor 16 to rotate less rapidly, thus tending to lengthen the slack loop 2a.

The effect of the motion-retarding means 28 has not yet been taken into consideration, however, and hence, as thus far set forth, the sensing device 26 is only sensitive to the position of the dancer arm 12, and not to its rate of movement.

The motion-retarding means 28 is connected to the motion-transmitting member 54 by arm 64, the connection being at point 66 which is more remote from the operative part 30 and the fulcrum 52 than is the point 58. As here specifically disclosed the motion-retarding means comprises a dashpot, usually one in which the degree of damping can be adjusted, and preferably one in which an individual adjustment is possible in each of the opposite directions of movement of the dashpot piston. For the thread-winding control system specifically disclosed, it has been found preferable that the dashpot 28 be free (exert no appreciable damping action) for movement of the dashpot piston to a right as shown in the drawings (corresponding to a lowering of the dancer arm 12) and that it exert an appreciable damping force when the dashpot piston moves to the left (corresponding to a rising movement of the dancer arm 12). The functioning of this arrangement can best be seen from a comparison of FIGS. 2–5.

FIG. 2 discloses the system in its normal situation, with the length of the slack loop 2a being such, in conjunction with the tension of the spring 20 on the horizontal dancer arm 12, as to produce the desired tension in the thread being wound. The motor 16 has been adjusted by the manual control 18 to rotate at the proper speed. The control and sensing parts are stationary.

Figure 5:
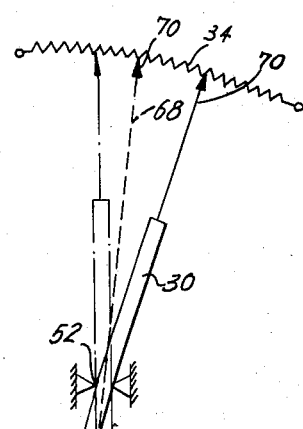
FIG. 5 is a schematic view showing more or less generically the manner in which the built-in lead is mechanically produced in the embodiment of FIG. 1–4.

If now the length of the slack loop 20 should decrease, thus indicating an increase in tension in the thread being wound, the dancer arm 12 will rise, as indicated in FIG. 3, that figure showing the parts while they are in motion. The mechanical input member 56 moves to the left and pulls the motion-transmitting member 54 along with it. However, the motion-retarding means 28 does not move as rapidly, and hence the motion-transmitting member 54 bends (see also the schematic showing in FIG. 5). As a result of that bend, the displacement of the contact-controlling member 32, effectively at the tip of the operative part 30, will move more than is called for merely by the change in position of the mechanical input member 56 from its initial nominal position. Compare the solid line showing in FIG. 5 with the dash line showing designated 68, the dash line schematically representing the position of the resistance control 70 based solely on the position of the input member 56, the solid line indicating the position of resistance control 70 taking not only into account the position of the input member 56 but also the bending of the motion-transmitting member 54. The degree of this bending, and hence the degree of "over-control" or "anticipation," or "lead" will be determined in part by the speed with which the input member 56 is moved and in further part by the resistance which the motion-retarding means 28 applies thereto. For a given speed of movement of the input member 56, the amount of "lead" produced can be increased or decreased by increasing or decreasing the motion-retarding action of the dashpot 28.

Where the input member 56 comes to a stop, the resiliency of the bent motion-transmitting member 54 still exerts a force on the piston of the dashpot 28, and eventually, when the motion-transmitting member 54 straightens, it will assume a position such as that shown in dash lines in FIG. 5, the operative part 30 then accurately reflecting in its position the position of the input member 56.

With the motion-retarding means 28 set as described, so that it is free when its piston moves to the right as viewed in the drawings, downward movement of the dancer arm 12 will produce movement of the operative part 30 which is strictly related to the position of the input member 56, and not at all to its speed of movement. This is indicated in FIG. 4, where it is shown that the motion-transmitting member 54 does not bend while the dancer arm 12 moves downwardly.

Of course, in other systems presenting other specific stability and control problems, it may be desired to produce a "lead" in both directions of operation, with the magnitude of the lead possibly differing from one direction to another. This can readily be done in accordance with the present system merely by utilizing a motion-retarding means 28 which is effective in the desired manner. Thus, a dashpot may be used provided with individual adjustments, such as valves, effective for control of movement of the piston in each opposite direction. Such dashpots are currently available.

It can be demonstrated mathematically that the degree of response of the mechanical system disclosed to the speed of movement of the mechanical input member 56 is directly related to the damping coefficient of the dashpot and to the product of the linear distances between points 66 and 58 and points 58 and 52, and is inversely related to the elasticity of the motion-transmitting member 54 and the moment of inertia of the moving parts of the sensing device 26. Through appropriate design, therefore, the desired degree of "lead" can be built into the system, and when an adjustable motion-retarding means 28 such as an adjustable dashpot is employed, adjustment of the system, even when it is installed and in operation, is simplified and greatly facilitated.

FIG. 8 discloses another arrangement by means of which a motion-retarding element such as a dashpot can be employed to produce a signal the magnitude of which is dependent upon the magnitude of the input and also leads the input in accordance with the rate at which the input is changing. As there schematically disclosed, the mechanical input member 56' is movable in the direction of the arrow 72 and is connected to the arm 74 so that the latter moves with the former. The arm 74 carries a slide contact 76 electrically connected in any appropriate output circuit by a lead 78, that contact 76 engaging and sliding over resistor 80, one end of which is connected to the output circuit by lead 82. The resistor 80 is itself movable in the direction of the arrow 72, as by being mounted on form 84 which is constrained for movement in that direction. One end of the form 84 is connected to the piston of motion-retarding dashpot 28. The form 84 is connected by arm 86 rigid therewith and by spring 88, to the arm 74. A second spring 90 connects the arm 86 to some relatively fixed structural part. In this arrangement, if the motion-retarding means 28 is rendered ineffective, upward movement of the input member 56' will cause the arm 76 to move up a corresponding distance. The combined action of the springs 88 and 90 will cause the resistor 80 to also move up, but a certain amount of relative movement between the contact 76 and the resistor 80 will occur by reason of the stretching, and consequent increase in tension, of the springs 88 and 90. Thus the effective resistance in the output circuit will be changed as the position of the input member 56' changes, and the amount of that change will be dependent upon the new position of the input member 56'.

If now one considers the action of the motion-retarding means 28 as the input member 56' moves upwardly, for example, it will be appreciated that the motion-retarding means 28 will delay the upward movement of the resistor 80, the amount of that delay being dependent upon the rate of upward movement of the input member 56' and the degree of damping or motion-retardation exerted by the dashpot 28. Hence there will be a greater relative movement between the resistor 80 and the contact 76 carried by the arm 74, for a given position of the input member 56', when the input member 56' is moving rapidly than when it is moving more slowly or standing still. Thus with the arrangement of FIG. 8, as with the arrangement of FIG. 1–7, a signal is produced which is dependent not only on the magnitude of the input but also on the rate of movement of the input, increasing as the rate of movement of the input increases.

The arrangements here disclosed produce a lead or anticipation in a manner which is entirely mechanical and by virtue of the action of a mechanism which is sturdy, simple, relatively free of error-producing losses, fast-acting and readily adjustable. The parts of the mechanical system need not be made to any high degree of precision, they take up but a minimal amount of space, and require little or no maintenance. The system is inexpensive, utilizes readily available stock items, and results in a control action superior to that attainable from much more expensive and complicated prior art systems.

While but a limited number of embodiments have been here specifically disclosed, it will be apparent that the invention is not limited to the specific mechanical or electrical details thereof. For example, although in the embodiment of FIGS. 6 and 7 the yieldable motion-transmitting member 54 is shown as a part separate from but attached to the pivotally mounted operative part 30, those two structural elements could be formed integrally. Indeed, it is by no means necessary that the operative part 30 itself be rigid, provided that it has sufficient self-sustaining strength to perform its desired functions. Many different types of structures could be employed for the sensing device 26 other than the one here specifically disclosed in FIGS. 6 and 7. For example, as suggested in FIGS. 5 and 8, any available slide or rotary potentiometer or variable resistance could be used. A given direction of input movement could cause increase or decrease of control signal, as desired, and the relationship between input and output (disregarding rate of change) could be linear or have any desired degree of non-linearity. While a dashpot is preferred as the motion-retarding means 28, because of its accuracy, reliability and ease of adjustment, other motion-retarding devices could be employed, such as fly-wheels or rotary or slidable friction clutches. Many other variations may be made, all within the spirit of the invention as defined in the following claims.

I claim:

1. A sensing system comprising a sensing device having a first operative part which is movably mounted, a second part with respect to which said first part is movable, means for producing an output signal in accordance with the relative positions of said first and second parts, a movable mechanical input member, means operatively connecting said first operative part and said input member and movable in a given direction for causing the position of the latter to be determined by the position of the former, said operative connecting means including a part resiliently bendable in the direction of movement thereof as said connecting means transmits motion from said input member to said first operative part, motion-retarding means, and means operatively connecting said motion-retarding means to said resiliently bendable part in a sense to cause increased movement of said first operative part relative to said second part in accordance with the rate of movement of said input member.

2. A sensing system comprising a pair of relatively movable elements, means for producing an output signal in accordance with the relative position of said elements, a mechanical input member, means operatively connecting said input member to at least one of said elements and movable in a given direction for changing the relative position of said elements in accordance with the position of said input member, said operative connection including a part resiliently bendable in the direction of movement thereof as said connecting means transmits motion from said input member to said one of said elements, motion-retarding means, and means operatively connecting said motion-retarding means to said resiliently bendable means in a sense to cause increased relative movement of said elements in accordance with the rate of movement of said input member.

3. A sensing system comprising a sensing device having an operative part mounted for pivotal movement about an axis, a motion-transmitting member operatively connected at a first point to said part and extending therefrom beyond said axis, a movable mechanical input member operatively connected to said member at a second point spaced from said first point and from said axis, said member being movable in a given direction upon movement of said input member and being resiliently bendable in said given direction as it transmits motion from said input member to said operative part, and motion-retarding means operatively connected to said bendable member at a third point on the other side of said second point from said first point, thereby to cause said sensing device to sense both the position and the rate of movement of said input member.

4. A sensing system comprising a sensing device having an operative part mounted for pivotal movement about an axis, a resiliently bendable motion-transmitting member operatively connected at a first point to said part and extending therefrom in a given direction beyond said axis, said bendable member being movable and resiliently bendable in an operative direction substantially at right angles to said given direction, a movable mechanical input member operatively connected to said bendable member at a second point spaced from said first point and from said axis and adapted to move said bendable member in said operative direction, said bendable member bending in said operative direction as it transmits motion from said input member to said operative part, and motion-retarding means operatively connected to said bendable member at a third point on the other side of said second point from said first point and effective to retard movement of said bendable member in at least one sense in said operative direction, thereby to cause said sensing device to sense both the position and the rate of movement of said input member.

5. A control system comprising a device adapted to control a second device and having an operative part mounted for pivotal movement about an axis, a motion-transmitting member operatively connected at a first point to said part and extending therefrom beyond said axis, a movable mechanical input member operatively connected to said member at a second point spaced from said first point and from said axis, said member being movable in a given direction upon movement of said input member and being resiliently bendable in said given direction as it transmits motion from said input member to said operative part, and motion-retarding means operatively connected to said bendable member at a third point on the other side of said second point from said first point, thereby to position said operative part in accordance with the position and the rate of movement of said input member.

6. A control system comprising a device adapted to control a second device and having an operative part mounted for pivotal movement about an axis, a resiliently bendable motion-transmitting member operatively connected at a first point to said part and extending therefrom in a given direction beyond said axis, said bendable member being movable and resiliently bendable in an operative direction substantially at right angles to said given direction, a movable mechanical input member operatively connected to said bendable member at a second point spaced from said first point and from said axis and adapted to move said bendable member in said operative direction, said bendable member bending in said operative direction as it transmits motion from said input member to said operative part, and motion-retarding means operatively connected to said bendable member at a third point on the other side of said second point from said first point and effective to retard movement of said bendable member in at least one sense in said operative direction, thereby to position said operative part in accordance with the position and the rate of movement of said input member.

7. A sensing system comprising a sensing device having an operative part mounted for pivotal movemnt about an axis at a first point, a first member operatively connected to said part for movement therewith in a given direction and extending therefrom in a direction substantially perpendicular to that of said axis, a movable mechanical input member operatively connected to said first member at a second point spaced from said operative part and said first point, said first member being resiliently bendable in said given direction as it transmits motion from said input member to said operative part, and motion-retarding means operatively connected to said first member at a third point on the other side of said second point from said first point, thereby to cause said sensing device to sense both the position and the rate of movement of said input member.

8. A control system comprising a device adapted to control a second device and having a movable operative part mounted to pivot about an axis at a first point, a first member operatively connected to said part for movement therewith in a given direction and extending therefrom in a direction substantially perpendicular to that of said axis, a movable mechanical input member operatively connected to said first member at a second point spaced from said operative part and said first point, said first member being resiliently bendable in said given direction as it transmits motion from said input member to said operative part, and motion-retarding means operatively connected to said first member at a third point on the other side of said second point from said first point, thereby to position said operative part in accordance with the position and rate of movement of said input member.

9. The system of claim 8, in which said motion-retarding means comprises an adjustable dashpot.

10. The system of claim 8, in which said motion-retarding means comprises an adjustable dashpot effective to appreciably retard movement of the bendable member connected thereto in one direction and not appreciably in the opposite direction.

11. In a control system comprising a device to be controlled, means for sensing an external condition and translating said sensed condition into a change in position of a mechanical member, and means operatively connected between said device and said sensing means for controlling the former in accordance with said sensed condition; the improvement which comprises said controlling means comprising means having a movable operative part for deriving a device-controlling electrical signal corresponding to the position of said part, said part being pivotally mounted at a first point, a first member operatively connected to said part for movement therewith in a given direction, said mechanical member of said sensing means being operatively connected to said first member at a second point spaced from said first point, said first member being resiliently bendable in said given direction as it transmits motion from said input member to said operative part, and motion-retarding means operatively connected to said first member at a third point on the other side of said second point from said first point, thereby to derive an electrical signal in accordance with the position and the rate of movement of said mechanical member of said sensing means.

12. In a control system comprising a device to be controlled, means for sensing an external condition and translating said sensed condition into a change in position of a mechanical member, and means operatively connected between said device and said sensing means for controlling the former in accordance with said sensed condition; the improvement which comprises said controlling means comprising means having a movable operative part for deriving a device-controlling electrical signal corresponding to the position of said part, said part being pivotally mounted about an axis at a first point, first member operatively connected to said part for movement therewith in a given direction and extending therefrom in a direction substantially perpendicular to that of said axis, said mechanical member of said sensing means being operatively connected to said first member at a second point spaced from said first point, said first member being resiliently bendable in said given direction as it transmits motion from said input member to said operative part, and motion-retarding means operatively connected to said first member at a third point on the other side of said second point from said first point, thereby to derive an electrical signal in accordance with the position and the rate of movement of said mechanical member of said sensing means.

13. The system of claim 12, in which said motion-retarding means comprises an adjustable dashpot effective to retard movement of the bendable member connected thereto in one direction and not appreciably in the opposite direction.

14. In a winding system comprising a rotatively mounted element on which an elongated body is to be wound, variable speed means for driving said element, means for feeding said body to said element, means for forming a slack loop in said body, and feeler means engaging said slack loop and sensing the extent thereof; the improvement which comprises actuating means sensitive to a signal and operatively connected to said variable speed means for controlling the speed thereof in accordance with said signal, and control means comprising means having a movable operative part effective to produce a signal corresponding to the position of said part, means for feeding said signal to said actuating means, said part being pivotally mounted at a first point, a first member operatively connected to said part for movement therewith in a given direction, motion-transmitting connection means operatively connected between said feeler means and a second point on said first member spaced from said first point, said first member being resiliently bendable in said given direction as it transmits motion from said motion-transmitting connection means to said movable operative part, and motion-retarding means operatively connected to said first member at a third point on the other side of said second point from said first point, thereby to position said part, and hence produce a speed-controlling signal, in accordance with the position and rate of movement of said feeler means.

15. The system of claim 14, in which said motion-retarding means comprises an adjustable dashpot.

16. The system of claim 14, in which said motion-retarding means comprises an adjustable dashpot effective to retard movement of the bendable member connected thereto appreciably in one direction and not appreciably in the opposite direction.

17. In a winding system comprising a rotatively mounted element on which an elongated body is to be wound, variable speed means for driving said element, means for feeding said body to said element, means for forming a slack loop in said body, and feeler means engaging said slack loop and sensing the extent thereof; the improvement which comprises actuating means sensitive to a signal and operatively connected to said variable speed means for controlling the speed thereof in accordance with said signal, adjustable biasing means active on said feeler means in accordance with the winding tension desired, and control means comprising means having a movable operative part effective to produce a signal corresponding to the position of said part, means for feeding said signal to said actuating means, said part being pivotally mounted at a first point, a first member operatively connected to said part for movement therewith in a given direction, motion-transmitting connection means operatively connected between said feeler means and a second point on said first member spaced from said first point, said first member being resiliently bendable in said given direction as it transmits motion from said motion-transmitting connection means to said movable operative part, and motion-retarding means operatively connected to said first member at a third point on the other side of said second point from said first point, thereby to position said part, and hence produce a speed-controlling signal, in accordance with the position and rate of movement of said feeler means.

18. The system of claim 17, in which said motion-retarding means comprises an adjustable dashpot effective to retard movement of the bendable member connected thereto appreciably in one direction and not appreciably in the opposite direction.

19. The sensing system of claim 2, in which said pair of relatively movable elements respectively comprise a movably mounted electrical impedance element and a second movably mounted element, in combination with means operatively connecting said impedance element and said second element for producing an electrical signal in accordance with the relative positions of said elements, said input member being connected to one of said elements, means including said resiliently bendable means operatively connecting said one of said elements and the other of said elements, said motion-retarding means being rigidly operatively connected to said other of said elements.

References Cited in the file of this patent

UNITED STATES PATENTS

| | | |
|---|---|---|
| 535,484 | Carpenter | Mar. 12, 1895 |
| 2,285,654 | Hanna et al. | June 9, 1942 |
| 2,509,250 | Roberts | May 30, 1950 |
| 3,059,869 | Ash | Oct. 23, 1962 |